United States Patent [19]

Young et al.

[11] Patent Number: 4,804,170
[45] Date of Patent: Feb. 14, 1989

[54] COUNTERBALANCE ASSEMBLY FOR ROTATABLE ROBOTIC ARM AND THE LIKE

[75] Inventors: Frederick C. Young, Maineville; Walter Binder, Cincinnati, both of Ohio

[73] Assignee: Cincinnati Milacron Inc., Cincinnati, Ohio

[21] Appl. No.: 13,408

[22] Filed: Feb. 11, 1987

[51] Int. Cl.$^4$ .......................... F16F 1/38; F16F 1/48; B25J 19/00
[52] U.S. Cl. .................................. 267/279; 267/281; 267/285; 901/48
[58] Field of Search ............... 267/273, 279, 280, 281, 267/284, 285, 150; 901/28, 48, 49

[56] References Cited

U.S. PATENT DOCUMENTS

| | | | |
|---|---|---|---|
| 2,477,107 | 7/1949 | Lanchner | 267/280 |
| 3,717,231 | 2/1973 | Kaufeldt | 901/49 X |
| 4,130,027 | 12/1978 | Leighton | 267/281 X |
| 4,275,614 | 6/1981 | Okubo et al. | 267/180 X |
| 4,300,198 | 10/1981 | Davini | 901/28 X |
| 4,403,977 | 9/1983 | Bergles | 267/150 X |
| 4,589,639 | 5/1986 | Peifer et al. | 267/150 |
| 4,690,069 | 9/1987 | Willetts | 267/273 X |

OTHER PUBLICATIONS

B. F. Goodrich Catalog entitled "B. F. Goodrich Torsilastic Springs" (1986).
Promotional material from B. F. Goodrich entitled "Velvet Ride Suspension Systems from B. F. Goodrich" (1984).
B. F. Goodrich Catalog entitled "B. F. Goodrich Torsilastic Springs" (1986).

Primary Examiner—Andres Kashnikow
Assistant Examiner—Richard Potosnak
Attorney, Agent, or Firm—Frost & Jacobs

[57] ABSTRACT

There is provided a counterbalance assembly for use in combination with a rotatable robotic arm and the like in a robotic manipulator, where the robotic arm is rotated about an axis by a torque-producing device having a relatively stationary base. The assembly further includes a torsional spring comprising a pair of concentric tubes connected to each other by rubber, with one tube connected to the arm and the other tube connected to the base. In general, any torque created by the influence of gravity acting on the robotic arm, as it is rotated, is counterpoised by torsional wind-up in the spring due to proportional resistance of the rubber to torsional shear. This spring/arm combination thereby reduces the load on the torque-producing device.

2 Claims, 8 Drawing Sheets

COUNTERBALANCE ASSEMBLY FOR ROTATABLE ROBOTIC ARM AND THE LIKE

TECHNICAL FIELD

This invention relates to a counterbalance assembly for use with a rotatable arm or the like in a robotic manipulator, and, more particularly, to a counterbalance assembly for use with a robotic manipulator arm which is rotated about a rotation axis by a torque producing motor, and wherein the counterbalance assembly comprises a torsianal means having a resilient member for providing resistance to torsional shearing forces, and means for imposing torsional shearing force on the resilient member in response to rotation of the rotatable arm about the rotation axis.

BACKGROUND ART

It is commonly understood in situations where a rotatable arm of a robotic manipulator, or similar rotated lever mechanism, is rotated in a particular direction about an axis and held in place at such rotated position, that a torque load must be imposed at the axis of rotation in the direction opposite to the rotational movement of such arm or mechanism in order to hold the arm in such position. In particular, when a cantilevered robotic arm is rotated about an axis, a certain amount of rotational torque is required to maintain such robotic arm in rotated position (e.g., at a particular angle relative to the vertical or horizontal). If the robotic arm is relatively heavy, extends a substantial distance from the axis of rotation, and/or carries a payload at its distal end, the torque force required to maintain such arm in rotated position can be quite substantial. In this regard, circumstances may dictate the use of a much larger rotating motor or torque producing device simply to compensate for the substantial loads bearing on the rotation axis in use. Numerous attempts in the industry to use hydraulic or pneumatic devices to reduce the loads bearing on the driving motors of various rotatable robotic arms generally required undesirably large and complicated devices. As robotic manipulators are often used in manufacturing applications where working space is at a premium, cumbersome devices impose critical drawbacks. Moreover, added complexity not only adds to the cost of the robotic manipulator, but further adds to the cost of the maintenance thereof.

A robotic arm having a bearing support designed to overcome the size and complexity problems described above is shown in U.S. Pat. No. 4,546,233, which issued to H. yasuoka on Oct. 8, 1985. In particular, the Yasuoka patent discloses a robotic arm having a bearing support comprising a tension spring provided between a tiltable upper arm and a stationary robot base. The upper arm is supported tiltably on top of a rotary table which is mounted on the stationary table. A tension spring has one end fastened to the lower end of the tiltable upper arm, and its other end supported rotatably on the stationary table. Such tension spring is, therefore, tiltable and rotatable to correspond with the tilting and rotation of the upper arm, such that the spring remains in proper position to provide tension which urges the lower end of the upper arm in a direction opposite to that in which the arm has been tilted. In this manner, the Yasuoka bearing support reduces the load imposed on the motor for tilting the upper arm, without requiring large and complicated hydraulic or pneumatic load reducing devices. As can be seen from a review of the Yasuoka reference, however, the tension spring device itself requires a relatively substantial area within the center of the robotic device. It is often required (or at least desired) to route power lines and/or product supply lines (as appropriate) through the center of the robotic device for safety reasons and to minimize the space requirements of a robot. The rotating tension spring device shown in Yasuoka would make such use of the central portions of the robot difficult, if not impossible. Additionally, tension springs have a relatively short useful life and can fail catastrophically.

Consequently, despite all the prior work done in the industry in an effort to reduce the load bearing on a motor or other torque producing device in rotatable arm assemblies and the like, there remain problems of providing a dependable load reducing device which minimizes the cost, space requirements and interference with other parts and operations of the robotic manipulator. With prior art devices, it was necessary to incorporate cumbersome hydraulic or pneumatic devices, or utilize tension springs or counterbalancing weights which also require substantial space and have a relatively limited useful life.

DISCLOSURE OF THE INVENTION

It is an object of this invention to obviate the above-described problems.

It is another object of the present invention to provide a counterbalance assembly for use with a rotatable arm and the like of a robotic manipulator in a simple, relatively inexpensive, and space-minimizing manner.

It is yet another object of the present invention to provide a counterbalance assembly for use with a rotatable robotic arm comprising a torsional spring means having a resilient member providing resistance to torsional shearing forces, and means for imposing torsional shearing force on the resilient member in response to rotation of the rotatable arm about the rotation axis.

In accordance with one aspect of the present invention, there is provided a counterbalance assembly for use with a rotatable arm and the like in a robotic manipulator, wherein such arm is rotated about a rotation axis by a torque producing motor or similar means. The assembly further includes a torsional spring means having a resilient member for providing resistance to torsional shearing forces, and means for imposing torsional shearing force on the resilient member in response to rotation of the rotatable arm about the rotation axis, whereby resistance of the resilient member to the torsional shearing force establishes an effective counterbalancing force which reduces the load bearing on the torque producing device at the rotation axis.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 3:
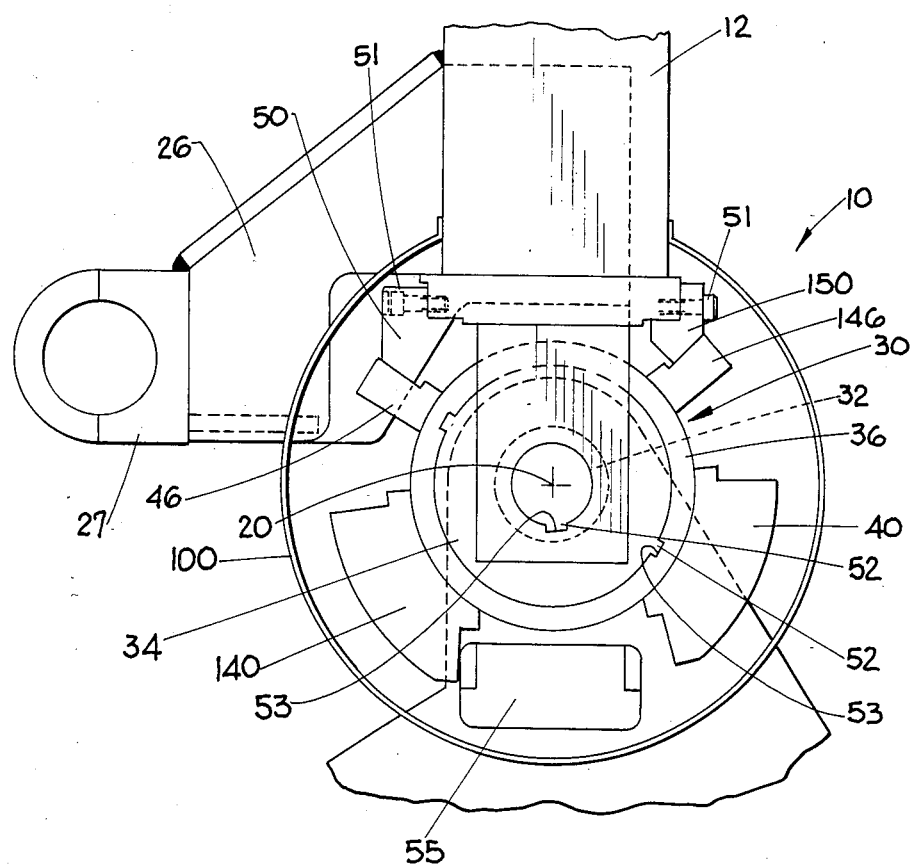
FIG. 3 is a fragmentary front elevational view of a portion of a robotic manipulator including a counterbalance assembly made in accordance with the subject invention.
Figure 8:
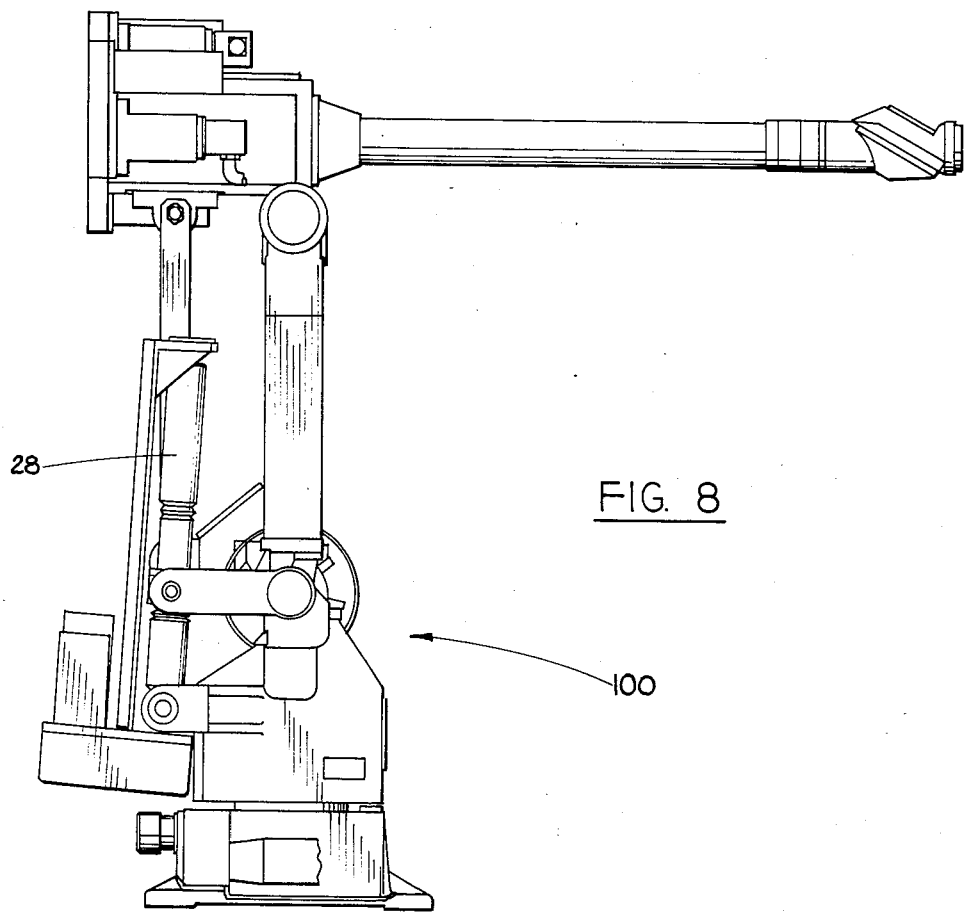
FIG. 8 is a front elevational view of an example of a robotic manipulator incorporating the counterbalance assembly of the subject invention.

Referring now to the drawings in detail, wherein like numerals indicate the same elements throughout the views, there is illustrated a preferred embodiment of a counterbalance assembly of the present invention. Counterbalance assembly 10 is shown in FIG. 3 as it might be used in conjunction with rotatable robotic arm 12 of a robotic manipulator (the entire robotic manipulator not being shown in FIGS. 1 through 7). It is contemplated that rotatable robotic arm 12 might be a supporting arm for a large movable piece of the robotic manipulator, or may be a movable robotic arm having a payload or similar working piece (e.g., a remote welder or spray gun, or the like) at its distal end. It is contemplated that rotatable robotic arm 12 is to be rotated about rotation axis 20 (which extends vertically into the assembly 10 as shown in FIG. 3) by a torque producing means (not shown). In this regard, rotatable robotic arm 12 is connected by a torque link assembly 26 to a bearing block 27 to be connected to a common ball screw arrangement, such as indicated at 28 of FIG. 8. The manner in which rotatable robotic arm 12 is rotated, however, is not critical, and the structure illustrated herein is shown only as an example of a preferred mode.

Located concentrically around rotation axis 20 is torsional spring means 30. It is contemplated that the term "torsional spring means" can connote any structure or assembly which provides resistance to torsional shearing force, with such resistance being substantially proportional to the rotational deflection imposed thereon. In particular, it is contemplated that torsional spring means 30 will further comprise at least one resilient member 34 and means for imposing torsional shearing force on resilient member 34 in response to rotation of rotatable robotic arm 12 about rotation axis 20.

Figure 1:
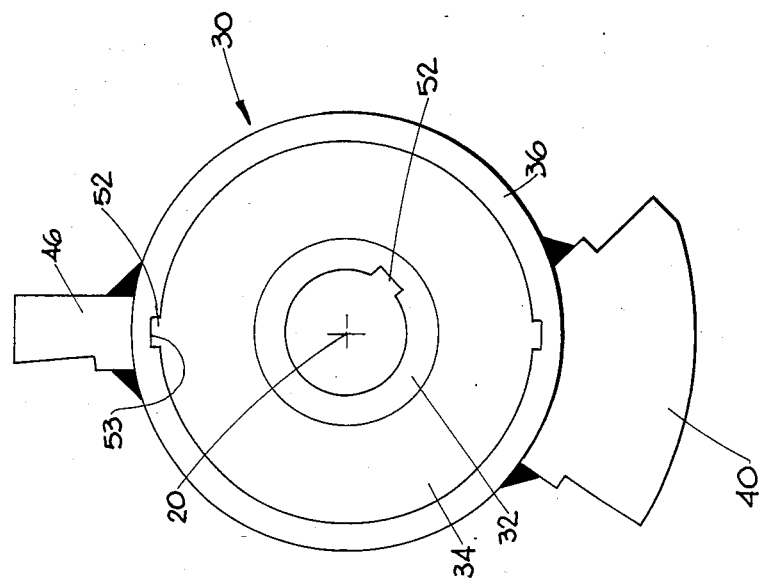
FIG. 1 is a front elevational view of a torsional spring means of the present invention.
Figure 2:
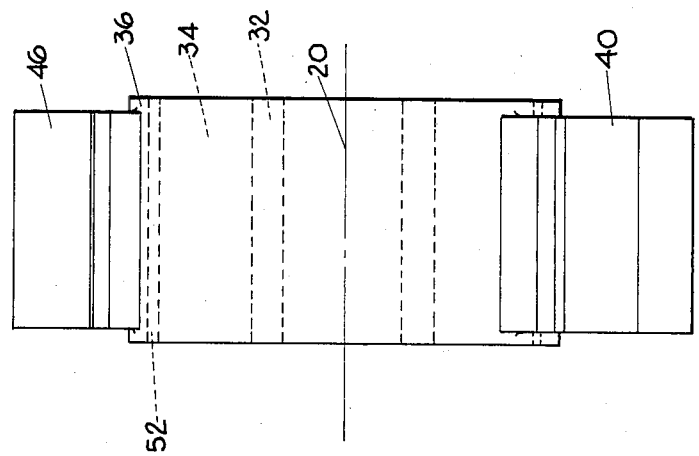
FIG. 2 is a left side view of the torsional spring means of FIG. 1.

More specifically, as best shown in FIG. 1, torsional spring means 30 is comprised of an inner housing 32, a resilient member 34, and an outer housing 36. The inner housing 32 is to be attached to rotation axis 20 for rotation therewith. Resilient member 34, preferably made of rubber or similar elastomeric material, is substantially immovably attached to inner housing 32. Outer housing 36 is then attached to resilient member 34. In a preferred embodiment, outer housing 36 is substantially hollow and arranged concentrically about inner housing 32, such that resilient member 34 is immovably attached to the outer surface of inner housing 32 and the inner surface of outer housing 36.

The method of attachment between rotation axis 20 and inner housing 32, as well as between resilient member 34 and outer housing 36, is preferably a key/keyway arrangement. For example, such key/keyway arrangement might comprise at least one notch or keyway 53 formed in the inner surface of inner housing 32 and the inner surface of outer housing 36, respectively, with a corresponding key or lug 52 formed on the outer surface of both rotation axis 20 and resilient member 34. These notches and lugs are preferably spaced about their respective elements to provide an effective and reliable locking interaction between the parts upon proper alignment.

A chock 40 is attached to the outer portion of outer housing 36 for limiting the rotational movement of outer housing 36 in a particular direction. In this way, outer housing 36 is held stationary when chock 40 engages an immovable portion of the robotic manipulator. The immovable portion of a robotic manipulator engaged by chock 40 is preferably a shoulder casting 55 or similar structure rigidly supported or integrally cast on the frame or base of the robot. By holding the outer housing 36 stationary while inner housing 32 continues to rotate with rotatable robotic arm 12 about rotation axis 20, a torsional shearing force is imposed on resilient member 34 between the two housings. Resistance of resilient member 34 to such torsional shearing force provides a counterbalancing force, or resistance, in the opposite direction of such torsional shearing force.

Figure 3A:
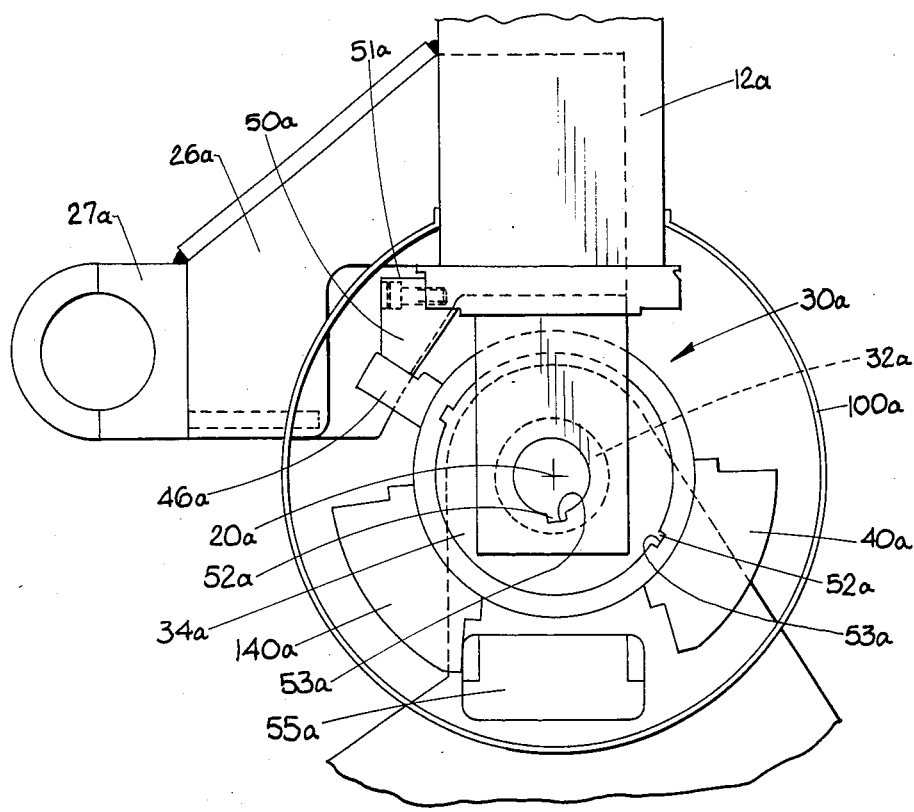
FIG. 3A is a fragmentary front elevational view of a portion of a robotic manipulator including a counterbalance assembly comprising only a single torsional spring means when the robotic arm is rotated in either direction.

In a preferred embodiment, a stop 46 is also attached to the outer surface of outer housing 36 at a point substantially opposite chock 40. As seen in FIG. 3, stop 46 is designed to rest against a back stop block 50 on the lower left portion of rotatable robotic arm 12. As described in greater detail below, stop 46 is utilized so that outer housing 36 imparts a slight, predetermined torsional shearing force on resilient member 34 when rotatable robotic arm 12 is in a substantially vertical or unrotated position (known as the pre-loading force). This pre-loading force keeps resilient member 34 in slight tension at all times, a condition which tends to force rotatable robotic arm 12 toward its unrotated position (i.e., an often desirable self-centering characteristic) while simultaneously helping to increase the longevity of the resilient nature of resilient member 34. As depicted in FIG. 3A, a single torsional spring means 30A utilizes a pair of chocks 40A and 140A to engage shoulder casting 55A from either side, depending upon the direction rotatable robotic arm 12A is rotated. The orientation of chocks 40A and 140A attached to outer housing 36A, then, dictates how much rotation in a specific direction is necessary before a respective chock 40A or 140A engages shoulder casting 55A, thus holding outer housing 36A stationary and enabling imposition of torsional shearing force on resilient member 34A by relative rotation between inner housing 32A and outer housing 36A. While a single stop 46A may be employed to impose a slight pre-loading torsional force on resilient member 34A, there are two drawbacks to this configuration. First, no self-centering feature would be available, since imposition of the slight pre-loading torsional shear would be in only one direction. Also, the pretension imposed by stop 46A will be met and overcome by engagement of chock 140A when the rotatable robotic arm 12A is rotated in the direction opposite of the pretension imposed by stop 46A. This means that at some point no counterbalancing force is available from resilient member 34A, which would permit the imposition of a peak load on the torque motor at that point. In addition, the wear and tear on resilient member 34A would be greatly increased, as it would necessarily be providing counterbalancing forces in both directions which rotatable robotic arm 12A is to be rotated, possibly reducing the useful life of such resilient member.

Figure 4:
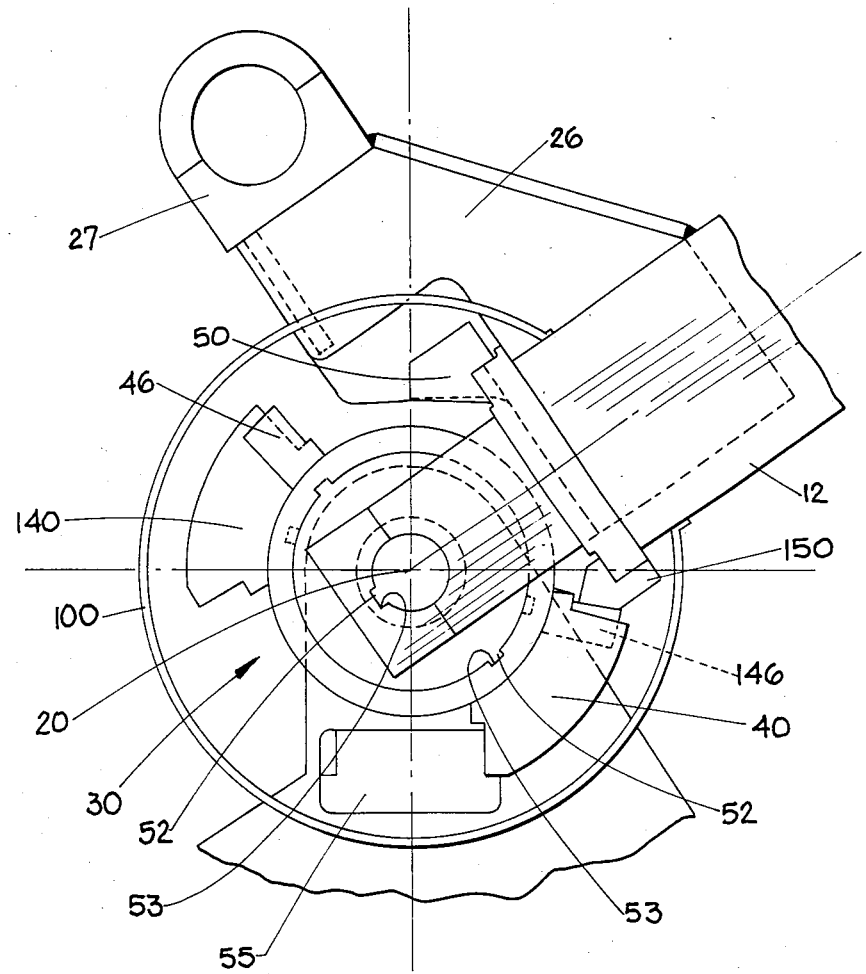
FIG. 4 shows the counterbalance assembly of FIG. 3, shown with the rotatable arm rotated in a clockwise direction relative its position in FIG. 3.
Figure 5:
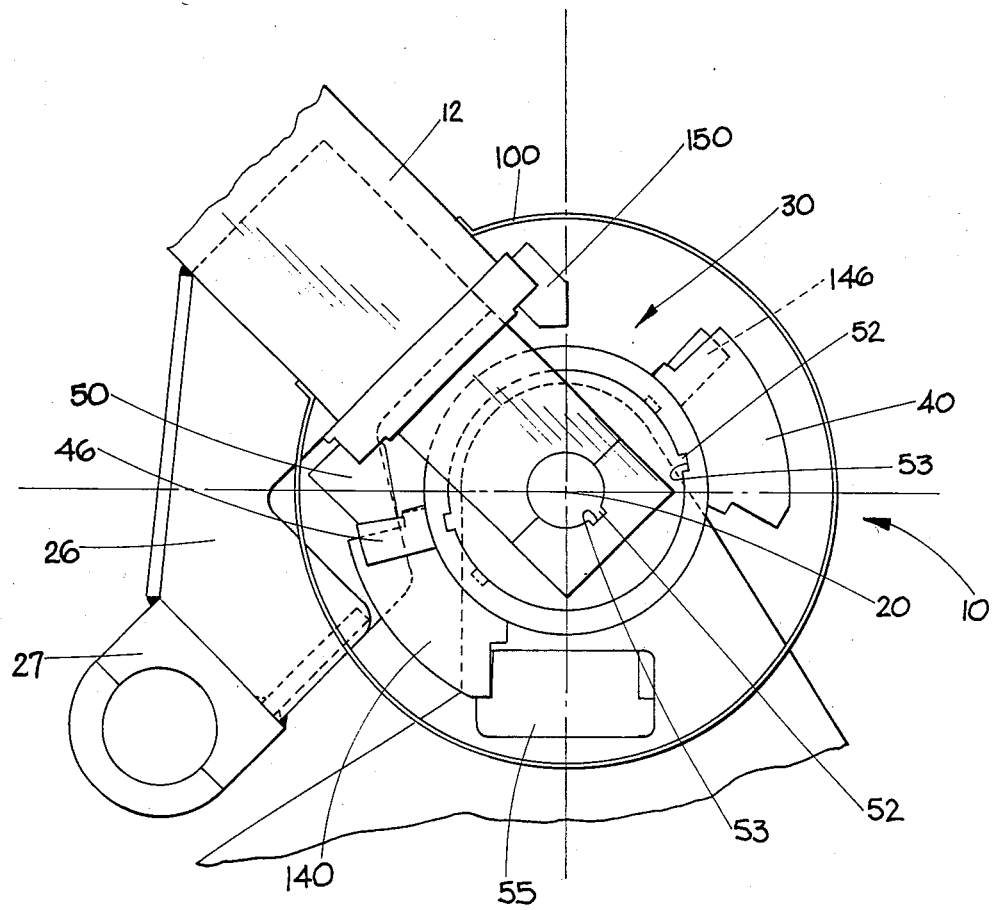
FIG. 5 shows the counterbalance assembly of FIG. 3, shown after rotation of the rotatable arm in a counterclockwise direction relative its position in FIG. 3.
Figure 6:
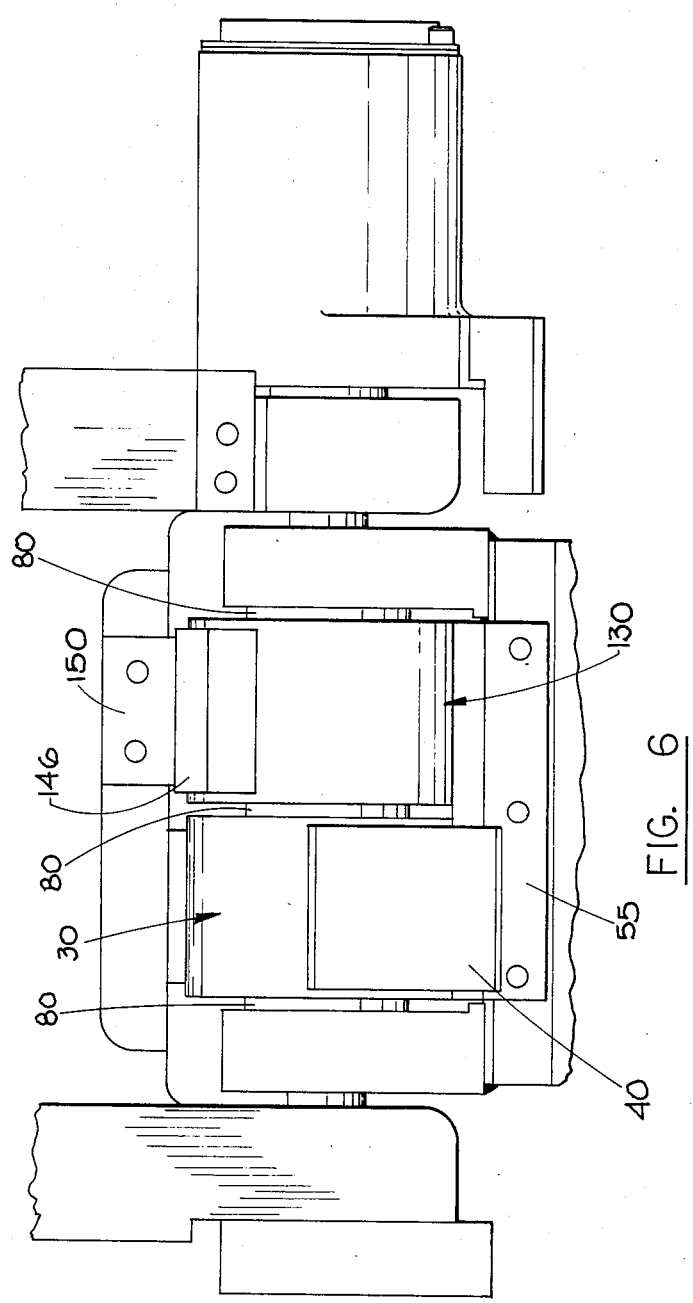
FIG. 6 is a partial right side view of a shoulder axis of a robotic manipulator incorporating the counterbalance assembly of the subject invention.
Figure 7:
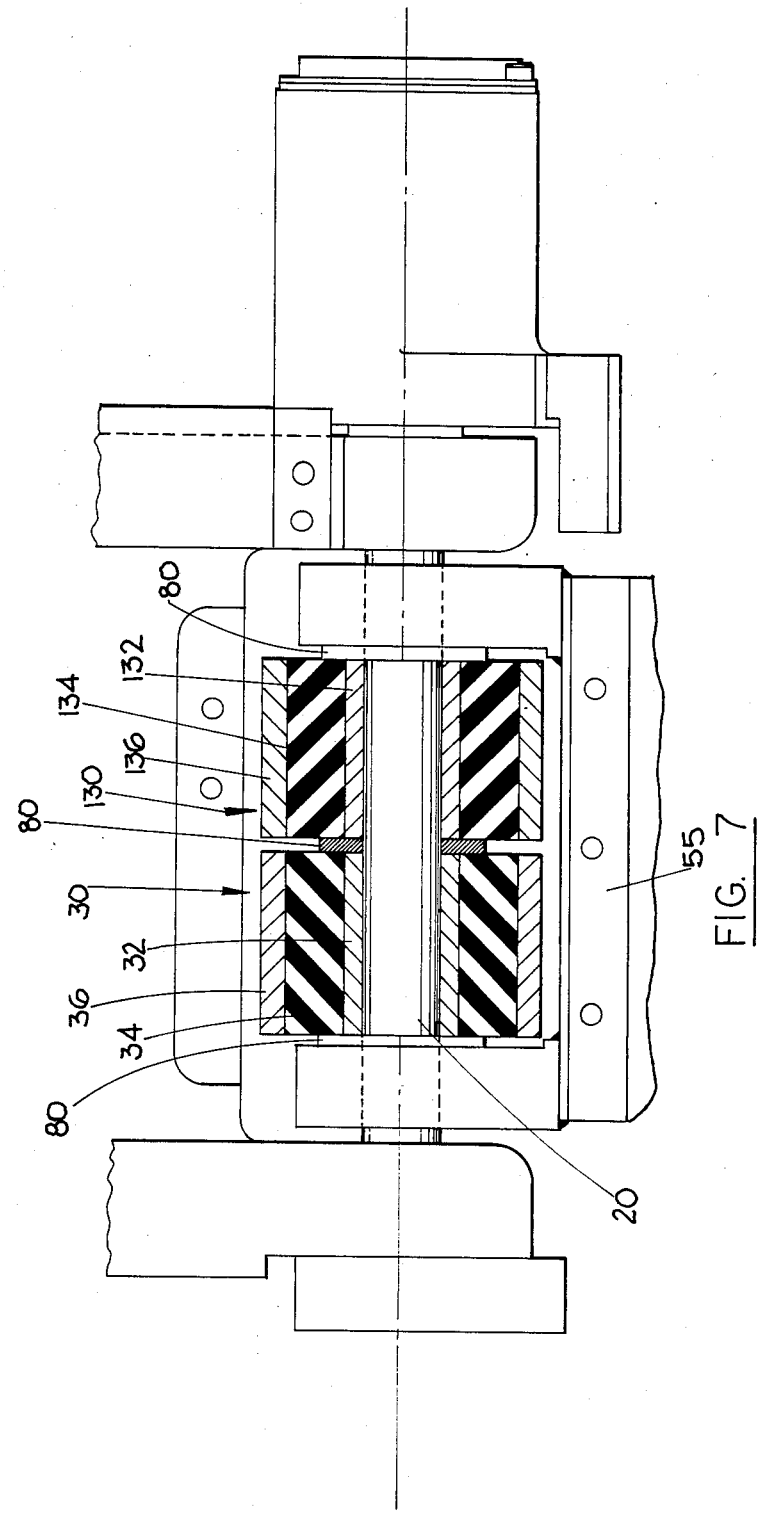
FIG. 7 is a partial right side view of a shoulder rotation axis of a robotic manipulator, such shoulder axis being partially broken away to show certain details and including a pair of counterbalance assemblies of the subject invention.

Even though only one torsional spring means could be utilized (as described above) to perform the counterbalancing function of the present invention, a preferred embodiment of the subject invention utilizes at least a pair of torsional spring, means 30 and 130. By employing separate torsional spring means for the different directions of rotation, the wear and tear on each is reduced, and the respective useful life of the resilient members lengthened. In use, one torsional spring means 30 provides counterbalancing forces when rotatable robotic arm 12 moves forward (or clockwise, as depicted in FIG. 4), while the second torsional sprig means 130 provides counterbalancing forces when rotatable robotic arm 12 moves rearwardly (or counterclockwise, as depicted in FIG. 5). This independence of movement is allowed through the use of spacers 80, which separate torsional spring means 30 and 130 from each other, as well as from the respective sides of the shoulder assembly (see FIGS. 6 and 7).

The function of the particular counterbalance assembly 10 shown in the drawing is best understood from FIGS. 3 through 5. FIG. 3 illustrates counterbalance assembly 10 as it would appear when rotatable robotic arm 12 is in a substantially vertical or unrotated condition. In this position, it is contemplated that resilient members 34 and 134 are in their least deflected position, with only a slight pre-loading torsional shearing force being applied by each torsional spring means 30 and 130. Such pre-loading could be accomplished by imposing rotational deflection upon each resilient member 34 and 134 during assembly of torsional spring means 30 and 130 onto the shoulder of the robot.

In a preferred embodiment, the preloading of torsional spring means 30 and 130 is carried out by the following procedure. First, rotation axis 20 is assembled through shoulder casting 55, along with torsional spring means 30 and 130. The rotatable robotic arm 12 is then lowered onto rotation axis 20, with stop blocks 50 and 150 not mounted as yet. Bolt caps are attached to lock rotatable robotic arm 12 to rotation axis 20, after which rotatable robotic arm 12 is rotated rearwardly 10°–15° from the vertical position. With rotatable robotic arm 12 prevented from moving, front back stop 150 is bolted onto the front lower portion of rotatable robotic arm 12 with bolt cap 51. Rotatable robotic arm 12 is then unblocked and rotated forward to a point 20°–25° from the vertical position where rotatable robotic arm 12 is again blocked from moving. The back stop block 50 is then bolted onto the back lower portion of rotatable robotic arm 12, whereupon rotatable robotic arm 12 is unblocked and rotated rearward to its vertical position. With rotatable robotic arm 12 in a vertical position, torsional spring means 30 and 130 are pre-loaded to a 5° wind up. Such pre-loaded torsional shearing force augments the tendency of counterbalance assembly 10 to force rotatable robotic arm 12 toward its vertically aligned position, thereby providing an automatic centering mechanism for such rotatable robotic arm 12.

Due to the foregoing procedure, stops 46 and 146 rest against back stop block 50 and front stop block 150, imposing a slight measure of torsional shearing force on resilient members 34 and 134, respectively. This slight torsional shearing force works to force rotatable robotic arm 12 toward its unrotated position, or as a self-centering means, while simultaneously helping to increase the longevity of the resilient nature of each resilient member by maintaining a slight constant strain on such member.

While FIG. 3 illustrates rotatable robotic arm 12 in a substantially vertical condition, FIGS. 4 and 5 have been included to illustrate the counterbalancing function of the invention when a robotic arm (e.g., 12) is rotated from such vertical condition. In particular, in FIG. 4 rotatable robotic arm 12 has been rotated clockwise (forward) approximately 55° with torsional spring means 30 providing the counterbalancing force. It can be seen by a comparison of FIGS. 3 and 4, that such rotation has caused torsional spring means 30 and 130 to rotate about rotation axis 20. After chock 40 engages shoulder casting 55, outer housing 36 can no longer rotate in conformity with rotatable robotic arm 12 and inner housing 32. Additional rotation of inner housing 32 relative outer housing 36 causes a torsional shearing force to be imposed between inner housing 32 and outer housing 36 on resilient member 34. The resistance of resilient member 34 to the torsional shear establishes an effective counterbalancing force which is transferred through counterbalance assembly 10 to rotatable robotic arm 12, thereby reducing the load bearing on the torque producing motor rotation axis 20.

Meanwhile, torsional spring means 130 is allowed to continue rotating until rotatable robotic arm 12 is limited by chock 40. Because chock 140 does not engage, no rotational deflection is imposed on resilient member 134. Therefore, torsional spring means 130 does not provide any counterbalancing force since no torsional shear is imposed thereon.

FIG. 5 illustrates the rotation of the rotatable robotic arm 12 in a counterclockwise (rearward) direction approximately 45°, with torsional spring means 130 providing the counterbalancing force. When compared to FIG. 3, it is seen that torsional spring means 130 has rotated about rotation axis 20 until chock 140 has engaged shoulder casting 55. Thereafter, outer housing 134 no longer can rotate along with rotatable robotic arm 12 and inner housing 132 (see FIG. 7). Additional rotation of inner housing 132 relative outer housing 136 causes a torsional shearing force to be established on resilient member 134, which is reflected in the rotational deflection of resilient member 134. The resistance of resilient member 134 establishes an effective counterbalancing force to the torsional shear imposed on counterbalance assembly 10. Consistent with the above, no torsional shear imposed on resilient member 34, and, therefore, torsional spring means 30 provides no counterbalancing force to the rearward rotation of rotatable robotic arm 12.

The two torsional spring means 30 and 130 utilized in the preferred embodiment work independently of each other. Depending upon which direction rotatable robotic arm 12 is rotated, only one torsional spring means will provide counterbalancing force, since only its chock will engage shoulder casting 55. While each torsional spring means rotates relative to rotatable robotic arm 12 and rotation axis 20, the respective chocks 40 and 140 need rotate only a minimal amount in a given direction to engage shoulder casting 55. Therefore, one torsional spring means will rotate in conjunction with rotation axis 20, but its chock is rotated away from casting 55 and, therefore, does not engage the same.

Rotatable robotic arm 12 is limited in its rotation to a specified degree (either forward or back) by the size of the respective chocks, as it will at some point engage both shoulder casting 55 and either front stop block 150 or back stop block 50. This is evident in FIG. 4, where chock 40 has engaged shoulder casting 55 and front stop block 150, preventing further forward rotation of rotatable robotic arm 12. Meanwhile, torsional spring means 130 will not produce resistance for the counterbalancing of the torsional shearing force imposed since chock 140 will not be engaged. Indeed, no torsional shearing force and no rotational deflection would result upon resilient member 134 of torsional spring means 130 since it is allowed to move freely with the rotation of rotatable robotic arm 12 and rotation axis 20.

It is contemplated that the resilient member need not be of a cylindrical shape, or even of a one-piece construction. In a preferred embodiment, however, such a cylindrical, one-piece construction is utilized for resilient members 34 and 134 in order to take advantage of the commercial availability of such a cylindrical, one-piece resilient member (i.e., as available from B. F. Goodrich, Akron, Ohio), as well as the durability of such a one-piece construction.

It is also contemplated that a protective cover 100/100A (as depicted in FIGS. 3, 3A, 4 and 5) be employed to protect torsional spring means 30 and 130 from dust, oil, and other foreign matter which could hamper performance of their counterbalancing function, as well as falling objects which could damage counterbalance assembly 10. Protective cover 100/100A, which is constructed of stainless steel or other suitable materials, encircles the entire counterbalance assembly 10, but is either open at its ends or such ends are constructed of transparent material (thus enabling inspection ad maintenance from time to time).

As mentioned above, while it is possible to utilize only one torsional spring means for rotation in either a forward or backward direction, the preferred embodiment utilizes at least two torsional spring means 30 and 130. Each torsional spring means is then responsive to rotation of rotatable robotic arm 12 in only one direction.

The choice of size for the torsional spring means and the number of individual torsional spring means structures required for any particular application may vary widely. For instance, in a particular application, one might design counterbalance assembly 10 in order to provide a predetermined amount of counterbalancing force. Therefore, a resilient member of greater thickness may be employed. Alternatively, more than one torsional spring means may be utilized for counterbalancing rotation of rotatable robotic arm 12 in a specific direction. Such use of multiple torsional spring means would further enhance the amount of counterbalancing force available, as well as the durability of each respective torsional spring means. This advantage of multiple torsional spring means stems from the fact that the amount of resistance to the rotational deflection imposed on the resilient member is substantially proportional to the rotation of rotation axis 20, such that the effective counterbalancing force created by the resilient member increases substantially linearly with each increment of rotation of rotatable robotic arm 12. The counterbalancing fore then minimizes the torque required to maintain rotatable robotic arm 12 at any given position, thereby reducing torque input requirements.

While the torsional spring means has been described herein as including one or more resilient members, it is contemplated that any structure which exhibits substantially proportional resistance to rotational deflection could also be utilized. Having shown and described the preferred embodiment of the present invention, further adaptions of the counterbalance assembly can be accomplished by appropriate modification by one of ordinary skill in the art without departing from the scope of the present invention. Several alternatives and modifications have been described herein, and others will be apparent to those skilled in the art. Accordingly, the scope of the present invention should be considered in terms of the following claims and is understood not to be limited to the details of the methods and structures shown and described in the specification and drawings.

What we claim is:

1. A counterbalance assembly in combination with a rotatable arm and the like in a robotic manipulator, wherein such arm is rotated about a rotation axis by a torque producing device, said assembly comprising a torsional spring means for providing an effective counterbalancing force at said rotation axis, said torsional spring means comprising:
    (a) a resilient member, said resilient member providing resistance to torsional shearing force imposed thereon;
    (b) an inner housing, said inner housing being attached to said rotation axis for rotation therewith;
    (c) a substantially hollow outer housing, wherein said resilient member is immovably attached to the outer surface of said inner housing and the inner surface of said outer housing so that said torsional shearing force is imposed on said resilient member in response to rotation of said inner housing relative said outer housing, whereby resistance of said resilient member to said torsional shearing force establishes an effective counterbalancing force which reduces the load bearing on the torque producing device at the rotation axis; and
    (d) means for limiting rotational movement of said outer housing about said rotational axis, wherein said limiting means comprises:
        (1) a chock attached to said outer housing for limiting rotational movement of said outer housing in a particular direction, whereby said outer housing is held stationary by engagement of said chock with an immovable portion of said robotic manipulator, and torsional shearing force is imposed on said resilient member by rotation of said inner housing relative said outer housing; and
        (2) a stop attached to the outer surface of said outer housing at a point substantially opposite said chock, wherein said stop rests against a back stop block on the lower portion of the rotatable robotic arm such that it imparts a slight, predetermined torsional shearing force on said resilient member when said rotatable robotic arm is in a substantially vertical or unrotated position.

2. A counterbalance assembly in combination with a rotatable arm and the like in a robotic manipulator, wherein such arm is rotated about a rotation axis by a torque producing device, said assembly comprising a first and second torsional spring means for providing an effective counterbalancing force at said rotational axis, said first and second torsional spring means each comprising:
- (a) a resilient member for providing resistance to torsional shearing force imposed thereon, said resilient member having a substantially cylindrical shape and a bore formed therethrough;
- (b) an inner housing, said inner housing being attached to said rotation axis for rotation therewith;
- (c) a substantially hollow outer housing, wherein said resilient member is immovably attached about the inner surface of its bore to the outer resurface of said inner housing and about its outer periphery to the inner surface of the outer housing so that torsional shearing force is imposed on said resilient member in response to rotation of said inner housing relative said outer housing;
- (d) a chock attached to said outer housing for limiting rotational movement of said outer housing about said rotation axis, whereby said first torsional spring means provides an effective counterbalancing force at said rotation axis in response to rotation of said rotatable arm in a forward direction about said rotation axis and said second torsional spring means provides an effective counterbalancing force at said rotation axis in response to rotation of said rotatable arm in a backward direction about said rotation axis; and
- (e) a stop attached to the outer surface of said outer housing at a point substantially opposite said chock, wherein said stop rests against a back stop block on the lower portion of the rotatable robotic arm such that it imparts a slight, predetermined torsional shearing force on said resilient member when said rotatable robotic arm is in a substantially vertical or unrotated position.

* * * * *